United States Patent [11] 3,572,897

[72] Inventor Samuel Bousky
Woodside, Calif.
[21] Appl. No. 711,032
[22] Filed Mar. 6, 1968
[45] Patented Mar. 30, 1971
[73] Assignee Ampex Corporation
Redwood City, Calif.

[54] OPTICAL MODULATOR HAVING DISSIPATIVE MATCHING BOUNDARIES
8 Claims, 5 Drawing Figs.

[52] U.S. Cl. .................................................. 350/160, 350/150, 350/165
[51] Int. Cl. .................................................. G02f 1/28
[50] Field of Search .................................................. 350/149, 150, 151, 160, 161, 165; 332/2.51

[56] References Cited
UNITED STATES PATENTS

| | | | |
|---|---|---|---|
| 2,392,350 | 1/1946 | Willard .......................... | 350/161 |
| 3,418,964 | 4/1947 | Arenberg ...................... | 350/161X |
| 3,229,106 | 1/1966 | De Ford et al. ............... | 350/150X |
| 3,304,428 | 2/1967 | Peters ........................... | 350/150X |
| 3,454,325 | 7/1969 | Ohm .............................. | 350/160 |

Primary Examiner—Ronald L. Wilbert
Assistant Examiner—Edward S. Bauer
Attorney—Robert G. Clay ABSTRACT: An improved optical modulator having means for dissipating the various, extraneous internal energies within the optical crystal, to thus improve the frequency response of the modulator, the means including impedance matching acoustic boundaries and refractive index matching optical boundaries disposed along selected sides and ends of the optical crystal, as well as acoustic and light dissipative or absorbing materials selectively disposed about the sides of the crystal. The acoustic matching on the surfaces of the crystal may be quarter-wave plates which provide an impedance match to the surrounding material to dissipate internal energy due to piezoelectric effects and the like. The refractive index matching on the surfaces of the crystal may also be quarter-wave transparent films of appropriate indices of refraction between the various mediums of the modulator through which the light beam passes. The dissipative materials absorb acoustic energies released to the surround, and extraneous light scattered or internally reflected within the crystal as the beam passes therethrough.

PATENTED MAR 30 1971
3,572,897
SHEET 1 OF 3
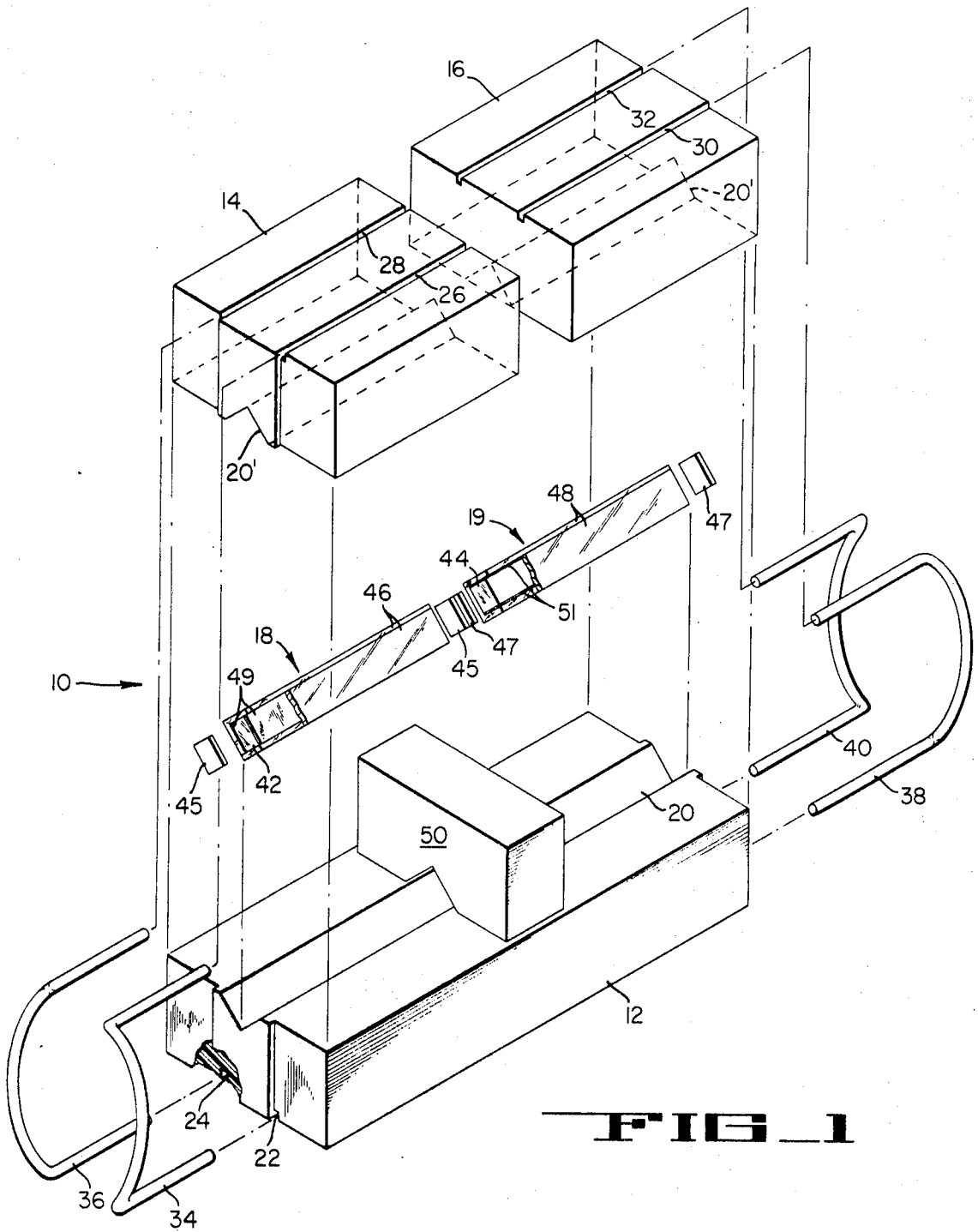
FIG_1
INVENTOR.
SAMUEL BOUSKY
BY Robert S. Clay
ATTORNEY

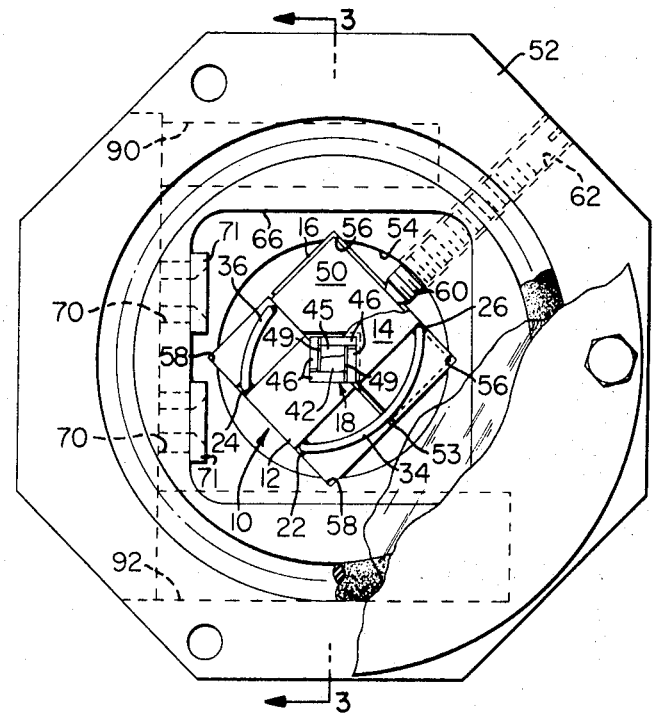
FIG_2
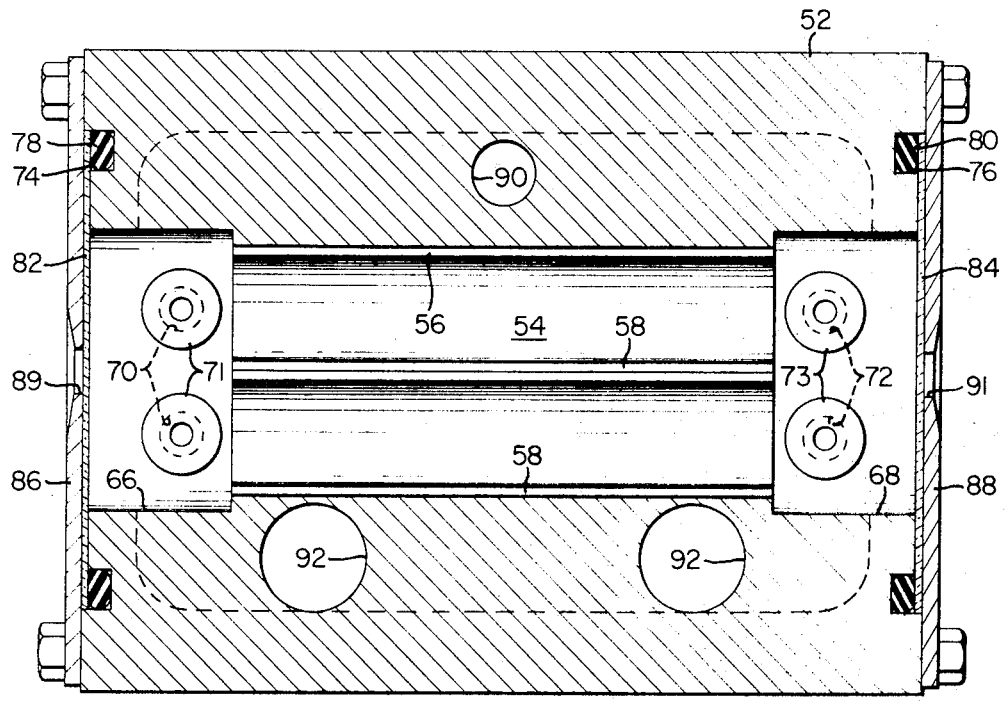
FIG_3
INVENTOR.
SAMUEL BOUSKY
BY Robert H. Clay
ATTORNEY INVENTOR.
SAMUEL BOUSKY
BY Robert H. Clay
ATTORNEY

3,572,897

OPTICAL MODULATOR HAVING DISSIPATIVE MATCHING BOUNDARIES

The invention herein described was made in the course of a contract with the Department of U.S. Army.

BACKGROUND OF THE INVENTION

The response characteristic of typical prior art optical modulators is often adversely affected by extraneous internal energies caused by internal Fresnel reflections, scattered light, and piezoelectrically or ferroelectrically induced variations in refractive index. The internal reflections and scattered light add to the background unmodulated, or improperly modulated, light level and may thus adversely affect the amplitude response of the modulator. Further, piezoelectric effects and the like may induce transient or standing acoustic waves within the modulator crystal, thus producing variations in internal refractive index at resonant frequencies or harmonics thereof. This in turn adversely affects the uniformity of frequency response of the prior art modulator.

SUMMARY OF THE INVENTION

In its basic embodiment, the present invention provides means for dissipating the various extraneous energies which may occur within the modulator crystal. The means includes acoustic and refractive index matching layers which may be quarter-wavelength, and absorbing materials which are selectively disposed relative to the crystal and surround, to provide acoustic and light dissipative means. Such means reduce the transverse acoustic waves with their associated variations of refractive index caused by piezoelectric effects, the Fresnel surface reflections caused by the mismatching of the indices of refraction, and the background light level caused by scattered or internally reflected beam light as it passes through the crystal. The standing or transient acoustic waves due to piezoelectric effects introduce regions of differing refractive index which detrimentally influence the longitudinal transmission of light through the crystal.

More particularly, in one embodiment, a crystal assembly, adapted to transmit light therethrough, is confined between clamping blocks of selected material, which in turn are forced together by spring clips to define a crystal assembly holder. The crystal assembly includes quarter-wave acoustic plates disposed between the sides of the crystal and the clamping blocks, along with a pair of opposed conductive electrodes which provide means for introducing a voltage across the crystal. In addition, the crystal assembly includes antireflection coatings which may be quarter-wave evaporated films at either end of the crystal, and if desired, a coating of light absorbing material is disposed along all sides of the crystal. The light absorbing material disposed under the electrodes is preferably electrically conductive. Furthermore, an antireflection coating may be applied under the light absorbing material to provide an optimum refractive index match between the crystal and the light absorbing material. The combination is placed within a support housing which may if desired include in addition, at least one heating element, a thermistor for temperature sensing, and low capacity feed-through insulators which provide passageways for conductors and thus connection to exterior electrical circuits. The housing is preferably filled with a suitable fluid such as silicon oil to enhance acoustic damping and thermal conduction.

Thus it may be seen that the invention provides "layers" which effect acoustic matching as well as optical matching between the crystal and the surround.

BRIEF DESCRIPTION OF THE DRAWING

FIG. 1 is a blown-apart perspective view of a crystal assembly and a crystal assembly holder of the invention.

FIG. 2 is an end view of the crystal assembly and holder upon assembly within a support housing.

FIG. 3 is a cross section view of the modulator support housing.

DESCRIPTION OF THE PREFERRED EMBODIMENTS

Figure 4:
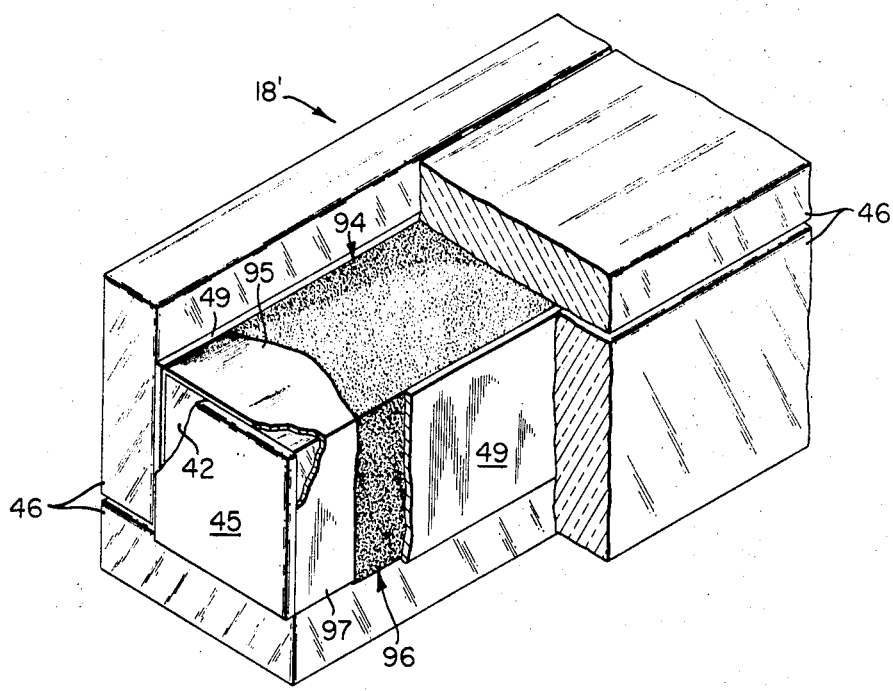
FIG. 4 is an enlarged, perspective view of one crystal assembly embodiment showing details thereof in cutaway.

Referring to FIG. 1, a clamping block crystal assembly holder 10 in accordance with the invention is shown in a blown-apart perspective view. The assembly holder 10 comprises a base clamping block 12 and two top clamping blocks 14 and 16 which, upon assembly, confine therebetween a pair of crystal assemblies 18 and 19. Although the invention is described herein with respect to two crystal assemblies 18 and 19, it is to be understood that one crystal assembly or more could be used rather than two. When two crystals with identical orientation of crystalline axes are used, one preferably is rotated 90° with respect to the other, whereby the electrodes of one crystal (further described infra) are disposed at 90° to the other crystal electrodes, which provides first order cancellation of birefringence effects without the need for an additional wave retardation plate between the two crystals. The clamping blocks 12—16 are provided with accurately machined V-channels 20 and 20' which are disposed in exact register upon assembly of the two top blocks to the base block. The base clamping block 12 is provided with assembly slots 22, 24 along the surface thereof opposite the V-channel 20, and the top clamping blocks 14, 16 are provided with assembly slots 26, 28 and 30, 32 respectively along the surface thereof opposite the V-channel 20'. Spring clips 34 and 36 are provided at one end of the clamping blocks 12 and 14, and upon assembly thereof the ends of the spring clips 34 are disposed in assembly slots 22, 26 while the ends of the spring clip 36 are disposed in assembly slots 24, 28. Similarly, spring clips 38, 40 are disposed in the assembly slots 22, 30 and 24, 32 respectively, at the opposite end of the clamping block 12 and the clamping block 16.

With regard to the crystal assemblies 18 and 19, a pair of electro-optically active crystals 42, 44, formed for example of lithium niobate, are confined by a plurality of "lateral" acoustic plates 46 and 48, respectively which for example may have a thickness of one quarter-wavelength. In addition, antireflection coatings 45 and 47 which may be quarter-wave refractive index "plates" are disposed against the ends of the crystals 42, 44 respectively. The material used to form the quarter-wave plates 45, 47 and 46, 48 should preferably have a refractive index equal to the square root of the product of the refractive indices of the crystal material and the surrounding oil, and should preferably have a thickness equal to one quarter-wavelength of the light transmitted therethrough, as is further described infra.

Referring to FIGS. 1, 2 (and FIG. 4 in part), the crystals 42, 44 are provided with a pair of thin metallic electrodes 49, 51 disposed along opposite lateral surfaces or sides of the crystal. The quarter-wave acoustic plates 46, 48 are then disposed about respective crystals 42, 44, whereby pressure on the plates generates a force against the crystals. The end quarter-wave plates 45, 47 are disposed against the ends of the respective crystals 42, 44 as previously noted. A mounting bridge 50 (FIG. 1) is provided which bears against the base clamping block 12 on assembly of the modulator as is further described with reference to FIG. 2.

Referring now to FIG. 2, in conjunction with FIG. 1, the clamping block, crystal assembly holder 10 is shown after it has been assembled together and disposed within a supporting housing 52 which is formed of a thermally conductive material such as aluminum. In assembly, the crystal assemblies 18 and 19 are placed within the V-channels 20, 20' in the base and top clamping blocks 12—16, and are then secured to the base clamping block 12 by the spring clips 34—40 to provide a selected pressure upon the electro-optically active crystals 42, 44. The force exerted by the spring clips 34—40 is determined by the spring constant and deflection of the spring clips, and may be varied to provide the required pressure upon the crystals. In the present invention, a force of approximately 1 pound is considered appropriate. As may be seen from FIG. 2, the confronting surfaces of the base and top clamping blocks 12 and 14, 16 are spaced apart to provide a slight gap 53 therebetween at such time as the vee-channels 20, 20' securely bear against the crystal assembly 18 upon assembly. Thus, only the forces exerted by the spring clips 34, 36, 38, and 40 are applied via the clamping blocks 12, 14, and 16, directly against the crystal assemblies 18 and 19.

To this end, clamping block crystal assembly holder 10 is secured within the support housing 52 by means of pressure applied to the clamping block 12 only. Thus, a cylindrical bore 54 is formed through the support housing 52, and is further axially machined at selected spaced-apart positions along its circumference, to define axially extending notches 56 and 58 suitable for receiving the corners of the assembled, crystal assembly holder 10. Since the pressure exerted against the crystal assemblies 18 and 19 is preferably regulated by the spring clips 34—40, the bridge 50 is placed between the top clamping blocks 14, 16, and a setscrew 60 is threadably disposed in a bore 62 with the end thereof abutting the bridge 50. Tightening the setscrew 60 causes it to bear against the top of the bridge 50, which in turn presses against the base clamping block 12 to urge same against the notches 58. Thus, the setscrew 60 maintains the base clamping block 12 in place by forcing it against the notches 58, and the spring clips 34, 36, 38, and 40 in turn secure the top clamping blocks 14 and 16 and associated crystal assemblies 18 and 19 respectively to the base clamping block 12.

Use of the clamping blocks 12—16, and more particularly the V-channels 20, 20' provides a clamping configuration whereby evenly distributed pressure can be applied to the two sets of four acoustic matching plates 46, 48, whereby optimum pressure is applied to the crystals 42, 44.

Referring to FIG. 3, there is shown in cross section the support housing 52, showing additional details of the construction thereof. Accordingly, the support housing 52 is provided with the bore 54 in which is machined the axial notches 56, 58. Cavities 66 and 68 are machined at either end of the housing 52 in communication with the bore 54, and conductor passageways 70, 72 are formed through the sidewall of the housing 52 in communication with the cavities 66, 68 respectively; see also FIG. 2. The passageways 70, 72 are provided with low capacity feed-through insulators 71, 73 adapted for passage therethrough of conductors (not shown) which allow connections to be made from the electrodes 49, 51 to the exterior circuits. Circular slots 74, 76 are machined into the opposite faces of the support housing 52 and are adapted to receive O-rings 78, 80 respectively. Transparent windows 82, 84 are disposed against the O-rings 78, 80 respectively, and are sealed in place against the respective ends of the housing 52 by means of annular end plates 86, 88 respectively, which are provided with central holes 89, 91. The transparent windows 82, 84 may be of glass or fused quartz and are made to have accurate plane-parallel faces, and are then coated on the external surface with a suitable optical antireflection layer to match the indices of refraction at the interface of air to window. It is to be understood that it may not be necessary to have antireflection coatings on the internal surfaces of the transparent windows, if the refractive index of the oil is substantially the same as that of the window material, as for example 1.40 and 1.48 respectively. The conductor passageways 70, 72 are sealed via the insulators 71, 73 about the conductors passing therethrough and a liquid such as heavy Dow-Corning 200 silicone oil is disposed in the cavity formed between the bore 54, cavities 66, 68, the crystal assembly holder 10, and the windows 82, 84, to enhance acoustic damping and thermal conductivity.

The support housing 52 is also provided with a transverse bore 90 in one wall thereof, and a pair of transverse bores 92 in the wall thereof opposite the location of the bore 90. Bore 90 is adapted to receive a thermistor (not shown) which provides means for sensing the support housing temperature if desired, and bores 92 are adapted to receive two resistors if desired, to act as heating elements (not shown). The heating elements may be connected to an exterior current source (not shown) and the thermistor is coupled into the circuit to provide heat sensing means which regulates the current flow through the heating elements and thus, the temperature of the support housing, by means well known to those skilled in the art.

The heating and heat sensing devices are not required for operation of the modulator in accordance with the invention, but define, generally, auxiliary-apparatus for optimum operation of the device. There exists the phenomenon wherein certain electro-optical crystalline materials seem to "remember" when a high intensity beam has passed therethrough, which causes a resulting distorted beam transmission. It has been found that this distortion becomes negligible, however, when the modulator, e.g., the support housing 52, crystal assemblies 18, 19 and holder 10, are operated at a temperature at least of the order of 50° Centigrade. Operating at such a temperature also tends to enhance the cancelling of the temperature dependent birefringence accentuated when the crystals are of slightly different lengths.

When completely assembled, the support housing 52 containing the clamping block crystal assembly holder 10, is preferably placed in a mounting block of low thermal conductivity which becomes part of the equipment in which the modulator is used. Granite or ceramic materials may be chosen for the mounting block, due to the face that they have low thermal conductivity and high thermal stability.

Accordingly, it may be seen that the present invention, is a preferred embodiment, provides a crystal holder which allows the placement of acoustic damping materials on all sides of the crystals 42, 44, while providing a selectable, evenly distributed pressure thereon. In addition, the invention requires no prealignment of the crystals with respect to each other, in the two-crystal device shown here by way of example only, since they are automatically aligned when placed in the V-channels 20, 20' and clamped via the clamping blocks 12—16.

Referring to FIG. 4, there is shown by way of example only, specific details of one embodiment 18' of the crystal assembly depicted by numerals 18, 19 of FIGS. 1 and 2. The assembly 18' includes the crystal 42, the lateral quarter-wave plates 46, the end quarter-wave plate 45, and the electrodes 49. In addition, the assembly 18' includes means integral with the crystal 42, for absorbing at the side surfaces, the light scattered within the crystal as the light beam passes therethrough. This means is provided in the form of a light-absorbing coating, which is applied to the sides of the crystal 42, such as an electrically nonconductive black paint applied to opposite sides of the crystal 42 as indicated by numeral 94. The light absorbing nonconductive paint may be any that can be thinly applied and that is compatible with the materials within the modulator structure. Preferably, the paint is applied over an antireflection coating, which is indicated at 95, to provide a better refractive index match with the paint resin. Alternately, however, the paint is composed of a resin having a refractive index such as to permit a good index match and maximum light absorption thereby precluding need for the antireflection coating 95. Since it is necessary to provide good electrical contact between the crystal 42 and the electrodes 49, the interfaces therebetween, i.e., the sides of the crystal at right angles to the sides indicated by numeral 94, are provided with a coating of a black, electrically conductive material, such as for example, an evaporated coating of gold antimonide, as indicated by numeral 96. The electrically conductive material 96 is preferably but not necessarily, applied upon an antireflection coating 97 formed of the same material for example as coating 95, and which performs the same function.

Thus light which is scattered from the beam as it passes through the crystal 42 may be dissipated by the light absorptive coatings 94, 96 which are applied to the sides of the crystal 42, yet electrical continuity is provided between the electrodes and their respective sides of the crystal. It should be understood that the invention performs satisfactorily without the light absorptive material, and that the use thereof provides an alternative configuration with more efficient performance.

Figure 5:
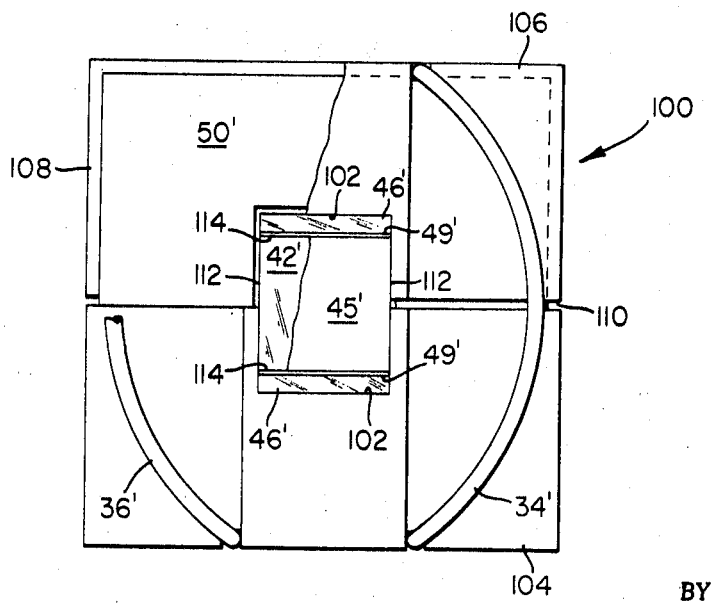
FIG. 5 is a cross section view of an alternative embodiment of the invention.

Referring to FIG. 5, there is shown an alternative crystal assembly holder 100 of the invention, utilizing a single pair of "lateral" quarter-wave acoustic plates 46' in place of the two pairs of plates 46, 46 and 48, 48 of FIGS. 1, 2 and 4. A pair of electrodes 49', formed, for example, of copper material, are disposed on opposite sides of a crystal 42'. The crystal 42' and electrodes 49' are disposed within matching, generally square channels 102 formed in a "square" clamping base block 104 and a pair of "square" clamping top blocks 106, 108. The blocks 104, 106, 108 are provided with a gap 110 between the confronting surfaces when assembled, and spring clips 34', 36' similar to those in FIGS. 1 and 2, are provided to urge the blocks 104 and 106, 108 together with selected force against the plates 46' and crystal 42'.

As shown in FIG. 4, the side surfaces of the crystal 42' may be coated with the light absorbing material in the manner described. For example, an electrically nonconductive black material is applied to surfaces 112 and an electrically conductive black material is applied to surfaces 114. The light absorbing material may be applied over an antireflection coating (not shown) as provided in the FIG. 4 embodiment, to optimize the refractive index match with the coating material. Further an "end" quarter-wave antireflection coating 45' is disposed against the ends of the crystal 42' in the manner previously described with reference to the holder 10 and housing 52 of FIG. 2. It is to be understood that a single plate 46' may be used in the place of a pair of opposing plates, and therefore that the number of plates is not restricted to four or two.

It is well known in the electrical communications art, that to enhance the passage of an electrical signal of a given wavelength from one transmission line to another of differing characteristic impedance, a joining line segment is employed, having a length of one-quarter of the signal wavelength, and an electrical impedance equal to the square root of the product of the impedances of the two lines to be joined. In this manner, reflections at the interface between the two transmission lines are avoided. An exactly analogous case pertains in optics in connection with antireflection surface coatings. Where light of wavelength $\lambda$ passes from a material of refractive index $N_1$ to another of refractive index $N_2$, maximum transmission through the surface occurs when a surface coating is applied whose thickness in the direction of light transmission is an odd multiple of a quarter-wavelength of the light transmitted and whose refractive index is equal to $\sqrt{N_1 N_2}$.

A parallel also exists in acoustics. The acoustic impedance of a material in the direction of transmission (i.e., longitudinal acoustic impedance) is equal to the product of the density and the longitudinal acoustic velocity. The free transmission of acoustic energy across a surface boundary may be effected by inserting at the boundary, a plate having appropriate thickness and impedance. Piezoelectrically generated acoustic energy within an electro-optical crystal may thus be released without building up regions of varying refractive index to disturb the passage of a light beam. A brief listing of typical acoustic impedances is:

| Material | Longitudinal acoustic velocity, meters/sec. | Longitudinal acoustic impedance, $10^6$ kg./sec·m.² |
|---|---|---|
| Aluminum | 6,420 | 17.3 |
| Bakelite* | 3,060 | 4.1 |
| Beryllium | 12,890 | 24.1 |
| Copper | 5,010 | 44.6 |
| Glass, Heavy Flint | 3,980 | 15.4 |
| Glass, Light Crown | 5,100 | 11.4 |
| Glass, Pyrex* | 5,640 | 13.1 |
| Iron, cast | 4,994 | 37.8 |
| Lead, rolled | 1,960 | 22.4 |
| Lithium Niobate | 7,230 | 34.0 |
| Lucite* | 2,680 | 3.2 |
| Magnesium | 5,770 | 10.0 |
| Polystyrene | 2,350 | 2.5 |
| Quartz, fused | 5,968 | 13.1 |
| Silver | 3,650 | 38.0 |
| Tin, rolled | 3,320 | 24.6 |

*Trademarks.

The clamping blocks (12—16 or 104—108) may be made of plastic material such as polystyrene or those identified by the trademarks, Lucite, or Bakelite which have acoustic impedances of 2.5, 3.2 and 4.1 respectively. Since lithium niobate has an impedance of 34.0, the three plastic materials would require matching plate impedances of 9.2, 10.4, and 11.8 respectively. The initially preferred embodiment therefore employs Bakelite together with light crown glass having an impedance of 11.4. An added advantage of Bakelite is that it may be obtained in fine cloth laminated form which is acoustically dispersive to aid in acoustic absorption.

In the initial embodiment, the size of the lithium niobate crystals employed produces a fundamental transverse piezoelectric resonance of 2.0 megahertz in the clamped condition. A second resonance at 2.8 megahertz is also observed which may be due to a diagonal mode. Quarter-wave plate thicknesses of light crown glass to match such resonances may be calculated from the acoustic velocity of 5100 meters per second; thus $$\frac{5.1 \times 10^6 \text{ mm./sec.}}{2.0 \times 10^6 \text{ cycles/sec.}} = 2.55 \text{ mm. per wavelength}$$

A quarter-waveplate for 2 megahertz would therefore be 0.64 mm. thick and for 2.8 megahertz, 0.45 mm. thick. In the initial embodiment 0.64 mm. thick plates are placed on two adjacent sides of each crystal and 0.45 mm. thick plates on the opposite pair of adjacent sides, thus providing matching for both resonances. Higher frequency resonances which fall at odd multiples of 2.0 and 2.8 megahertz are also matched since any odd multiple of a quarter-wavelength provides matching. The present invention however should not be considered as limited to quarter-wave plates or odd multiples of quarter-wave plates since multilayer plates may be designed as broad band or high-pass filters in accordance with well known principles as presently employed in the optical art of thin film coatings.

Copper electrodes, e.g., 49, 51, FIG. 1, have proven to be satisfactory in spite of the high acoustic impedance of copper, primarily because electrodes of only 0.01 mm. thickness or less are required, which is insufficient to disturb the acoustic match. Magnesium electrodes would probably be preferable from the standpoint of acoustic impedance.

Although the present invention has been described with respect to various embodiments, various modifications are possible within the spirit of the invention. For example, only one crystal need be utilized in place of the two crystals shown in the embodiments of FIGS. 1, 2 or FIG. 5, and a single top clamping block is then utilized to secure the crystal to the bottom clamping block respectively which, in turn, is secured to the support housing by selected screws or brackets. Various materials may be utilized in place of the materials specified in the description. For example, the blocks 12—16 and 104—108 may be made of Lucite rather than Bakelite as previously mentioned, or the block crystal assembly holder 10, 100 may be secured within the support housing 52 by means other than the setscrew 60 and bridge 50. Further, if optimum frequency response is not required, the modulator may be operated without the use of the temperature regulating devices as previously noted. Likewise, the single piece of glass which is used to form each of the plurality of plates 46, 46', 48 may be replaced by a multilayered configuration, where layers of glass are combined to provide each plate, which would then exhibit a band pass filter effect. Thus, it is not intended to limit the invention except as defined by the following claims.

I claim:

1. An improved optical modulator including an electro-optically responsive crystalline material disposed to receive and transmit a beam of light, including a pair of electrodes disposed against opposite sides of the crystalline material, and circuit means for energizing the electrodes to provide a selected voltage across the material, the improvement comprising; solid impedance matching layers disposed adjacent to the lateral surfaces of said crystalline material to prevent internal boundary reflections of acoustic energy from said surfaces.

2. The optical modulator of claim 1 further including coatings of a light absorbing material applied to the surfaces of the crystalline material, wherein selected pairs of opposed coatings are formed of an electrically conductive light absorbing material and are disposed under said pair of electrodes, and alternate pairs of opposed coatings are formed of electrically nonconductive light absorbing material.

3. The optical modulator of claim 2 further including an antireflection coating disposed between the crystalline material surfaces and the light absorbing material to provide optimum refractive index matching.

4. The optical modulator of claim 1 wherein the impedance matching layers are lateral acoustic plates which have a quarter-wave length thickness to match a piezoelectric resonance frequency of said crystalline material.

5. The optical modulator of claim 4 further including means abutting said lateral acoustic plates for applying an evenly distributed force thereagainst and thus against the crystalline material, said means for applying an evenly distributed force includes a pair of confronting clamping blocks, and resilient fastener means disposed thereabout to confine the crystalline material and the plate therebetween with the selected evenly distributed force, wherein said energies are coupled into the means for applying the force and are thus dissipated.

6. The optical modulator of claim 5 wherein a plurality of lateral plates are disposed along respective surfaces of the crystalline material, wherein the clamping blocks include matching confronting V-channels and the crystalline material and confining plates are disposed within the V-channels with the sides thereof substantially at 45° with respect to the facing surfaces of the clamping blocks.

7. The optical modulator of claim 5 wherein the clamping blocks include matching confronting "square" channels, wherein a single pair of lateral plates are disposed between opposite sides of the crystalline material, and the blocks apply pressure thereto from said opposite sides.

8. The optical modulator of claim 1 wherein the means for applying an evenly distributed force further includes support housing means of heat conducting material having a bore therein adapted to receive and retain therein the assembled clamping blocks, plates and crystalline material, said bore being filled with a fluid having selected properties of acoustic damping and thermal conductivity, and threaded fastener means disposed through the support housing means and adapted to bear against one of the blocks to secure same against the bore within the housing.